(12) United States Patent
Hopf et al.

(10) Patent No.: US 12,092,050 B2
(45) Date of Patent: Sep. 17, 2024

(54) METHOD AND DEVICE FOR OPERATING A FUEL INJECTION VALVE

(71) Applicant: Robert Bosch GmbH, Stuttgart (DE)

(72) Inventors: Andreas Hopf, Stuttgart (DE); Erik Tonner, Mehring (DE); Frank Kowol, Knittlingen (DE); Jens-Holger Barth, Fellbach (DE); Konrad Groh, Stuttgart (DE); Matthias Woehrle, Bietigheim-Bissingen (DE); Mona Meister, Renningen (DE); Roland Norden, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 40 days.

(21) Appl. No.: 18/001,774

(22) PCT Filed: Sep. 10, 2021

(86) PCT No.: PCT/EP2021/074953
§ 371 (c)(1),
(2) Date: Dec. 14, 2022

(87) PCT Pub. No.: WO2022/053623
PCT Pub. Date: Mar. 17, 2022

(65) Prior Publication Data
US 2023/0313752 A1     Oct. 5, 2023

(30) Foreign Application Priority Data
Sep. 11, 2020   (DE) .................. 10 2020 211 421.8

(51) Int. Cl.
*F02D 41/14*   (2006.01)
*G05B 13/02*   (2006.01)
*G06N 3/09*   (2023.01)

(52) U.S. Cl.
CPC ..... *F02D 41/1405* (2013.01); *G05B 13/0265* (2013.01); *G06N 3/09* (2023.01);
(Continued)

(58) Field of Classification Search
CPC ......... F02D 41/1405; F02D 2041/1433; F02D 2200/0602; F02D 2200/0618; G06N 3/09
See application file for complete search history.

(56) References Cited

U.S. PATENT DOCUMENTS 11,255,289 B2 * 2/2022 Oh ................ F02D 41/2467
2007/0203616 A1   8/2007 Borrmann et al.

FOREIGN PATENT DOCUMENTS

DE   102019209690 A1   3/2020

OTHER PUBLICATIONS

International Search Report for PCT/EP2021/074953, Issued Jan. 10, 2022.

* cited by examiner

*Primary Examiner* — Hung Q Nguyen
*Assistant Examiner* — Mark L. Greene
(74) *Attorney, Agent, or Firm* — NORTON ROSE FULBRIGHT US LLP; Gerard A. Messina

(57) ABSTRACT

A method for training a data-based evaluation model to determine an opening or closing time of an injection valve based on a sensor signal. The method includes: measuring an operation of the injection valve in order to determine at least one sensor signal and an associated opening or closing time; sampling the sensor signal at a sampling rate in order to obtain a sensor signal time series with sensor signal values; determining a plurality of training data sets by assigning a plurality of evaluation point time series generated from a sensor signal time series to the opening or closing time associated with the sensor signal, wherein the evaluation
(Continued)

point time series has a lower temporal resolution than the sensor signal time series; training the data-based evaluation model depending on the determined training data sets.

8 Claims, 3 Drawing Sheets

(52) U.S. Cl.
 CPC ............... *F02D 2041/1433* (2013.01); *F02D 2200/0602* (2013.01); *F02D 2200/0618* (2013.01)

METHOD AND DEVICE FOR OPERATING A FUEL INJECTION VALVE

FIELD

The present invention relates to a method for operating a fuel injection valve of an internal combustion engine using data-based models, in particular for determining a closing time or estimating an injected fuel quantity.

BACKGROUND INFORMATION

Electromechanical or piezoelectric injection valves are used for metering fuel in internal combustion engines. Said valves enable a direct and exactly measured supply of fuel into the cylinders of the internal combustion engine.

One challenge is to control the combustion process as precisely as possible in order to improve operating characteristics of the internal combustion engine, in particular in terms of fuel consumption, efficiency, pollutant emissions and smooth running. For this purpose, it is essential to operate the injection valves in such a way that the quantity of fuel to be injected can be metered with a high degree of repetition accuracy, at varying working pressures and, if necessary, with multiple injections per working cycle.

Injection valves can include an electromagnetic actuator or piezo actuator that actuate a valve needle to lift said valve needle from a needle seat and open an outlet opening of the injection valve to discharge the fuel into the combustion chamber. Because of structural differences and different operating conditions, such as temperature, fuel pressure and fuel viscosity, there is uncertainty when determining the exact opening time, i.e., the point in time from which fuel passes through the injection valve into the combustion chamber of the cylinder, and the exact closing time of the injection valve, i.e., the point in time up to which fuel passes through the injection valve into the combustion chamber of the cylinder.

SUMMARY

According to the present invention, a method for operating a fuel injection valve as well as a device and an injection system according are provided.

Example embodiments of the present invention are disclosed herein.

According to a first aspect of the present invention, a method for training a data-based evaluation model for determining an opening and/or closing time of an injection valve based on a sensor signal is provided. According to an example embodiment of the present invention, the method comprises the following steps:
measuring an operation of the injection valve in order to determine at least one sensor signal and an associated opening and/or closing time;
sampling the sensor signal at a sampling rate in order to obtain a sensor signal time series with sensor signal values;
determining a plurality of training data sets by assigning a plurality of evaluation point time series generated from a sensor signal time series to the opening or closing time associated with the sensor signal, wherein the evaluation point time series have a lower temporal resolution than the sensor signal time series;
training the data-based evaluation model depending on the determined training data sets.

Even though an injection valve is activated according to a predefined activation signal profile, the resulting opening and closing movements of the injection valve vary, so that the actual opening and closing times for starting and ending the fuel injection cannot be exactly specified. The reason for this lies in the complex dependencies of the valve movement on the current operating point.

In order to monitor the valve movement, a piezo sensor configured as a pressure sensor is provided in the injection valves to detect the pressure changes of a fuel pressure triggered by the activation of the injection valve and to provide a corresponding sensor signal. The measured sensor signal can now be evaluated to determine the actual opening and closing times of the injection valve in order to adjust the activation of the injection valve accordingly.

The sensor signal is also noisy, however, and depends in particular on the actual fuel pressure in the fuel supply and the duration of the activation to be measured.

The evaluation of the sensor signal for determining an opening and/or closing time of the injection valve can be carried out with the aid of a data-based evaluation model. The data-based evaluation model can correspond to or comprise a probabilistic regression model, a neural network or a classification model.

To train the evaluation model, time series of the sensor signal can be acquired. The actual opening and closing times of the respective injection valve for an internal combustion engine to be measured can be recorded on a test stand. This makes it possible to generate training data sets which each map a time series of a predetermined number of sampling times to an indication of an opening and/or closing time.

This approach is not robust, however, and can have a high degree of estimation uncertainty for the opening and/or closing time, in particular if there are variations in the opening and closing movement of the injection valve or anomalous pressure fluctuations during the open duration of the injection valve.

The resolution with which the opening and/or closing time has to be provided in order to enable sufficiently accurate monitoring of the injected fuel quantity is approximately 5 to 20 µs. These are intended to record sensor values within a time window between 200 µs and 1 ms, which includes the period of opening and closing of the injection valve.

The sensor signal can typically be sampled at a significantly higher sampling rate, e.g., between 0.1 and 5 µs. To ensure a sufficiently robust evaluation of the progression of the sensor signal for determining an opening and closing time, a number of sampling values (samples) between 40 and 100, which each provide an evaluation point for a specific evaluation time of an evaluation point time series, are sufficient.

The plurality of evaluation point time series can furthermore be generated from the respective one sensor signal by defining time windows which are spaced evenly in terms of time in accordance with the temporal resolution of the evaluation point time series and each comprise a plurality of successive sensor signal values, wherein, for each time window, one of the sensor signal values contained therein is randomly selected as the evaluation point, so that a plurality of different evaluation point time series comprising the evaluation points of the successive time windows are generated for one sensor signal.

The random selection of the sensor signal values can in particular be carried out according to a uniform distribution or a Gaussian distribution.

The idea here is to increase the number of training data sets for training the evaluation model. To create an evaluable evaluation point time series from the sensor signal, it can be oversampled with respect to the temporal resolution required for the evaluation point time series. Oversampling makes it possible to take into account multiple sampling values of the sensor signal for each evaluation time of the evaluation point time series to be evaluated. This is used to generate multiple evaluation point time series with lower temporal resolution from a sensor signal time series with a corresponding label, i.e., an indication of the opening and/or closing time, which are assigned to said corresponding label. This allows the number of training data sets to be increased significantly, which enables improved training of the data-based evaluation model. The training data sets generated in this way also enable a more robust creation of the data-based evaluation model.

The evaluation times in particular define time windows that are temporally successive or temporally equally spaced. The sensor signal values within the respective time windows can be taken into account for the determination of an evaluation point assigned to the time window or the corresponding evaluation time. It is proposed that the selection of one of the sensor signal values from each time window of an evaluation point be random. The random selection of a sensor signal value from each of the time windows defined by the evaluation times can be carried out according to a uniform distribution, a Gaussian distribution or another predetermined distribution. In other words, the probability that a sensor signal value within a time window will be selected is given by a distribution function. Since multiple executions of this procedure always result in different evaluation point time series, a large number of different evaluation point time series can be determined from one sensor signal time series. A respective training data set can be created by assigning each evaluation point time series to the underlying label assigned to the sensor signal time series.

According to a further aspect of the present invention, a method for operating an injection system, in particular in connection with determining an opening time and/or a closing time of an injection valve is provided. According to an example embodiment of the present invention, the method comprises the following steps:
  sampling the sensor signal at a sampling rate in order to obtain a sensor signal time series with sensor signal values;
  determining an evaluation point time series from the sensor signal time series by segmenting the sensor signal time series into equally spaced time windows and determining a respective evaluation point of the evaluation point time series based on the sensor signal values within the respective time window;
  determining the opening time and/or the closing time depending on the determined evaluation point time series and a data-based evaluation model, in particular an evaluation model trained according to one of the methods disclosed herein, wherein the data-based evaluation model is trained to assign the opening time or the closing time to an evaluation point time series;
  operating the injection system using the determined opening time and/or the closing time.

The operation of the injection valve can furthermore be carried out such that an open duration of the injection valve ascertained via the determined opening and/or closing time is set to a predetermined target open duration.

According to a further aspect of the present invention, a device for carrying out the above-described method is provided.

BRIEF DESCRIPTION OF THE DRAWINGS

Embodiments of the present invention are explained in more detail in the following with reference to the figures.

DETAILED DESCRIPTION OF EXAMPLE EMBODIMENTS

Figure 1:
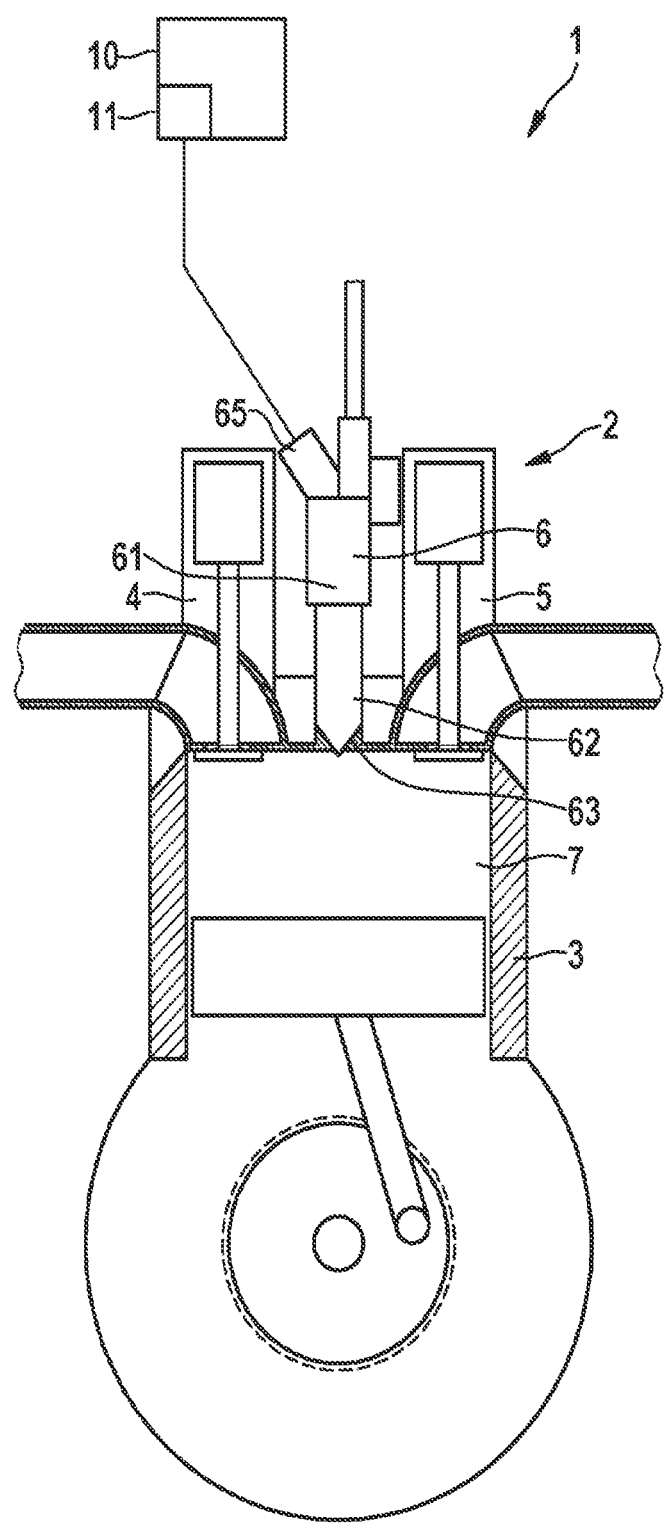
FIG. 1 shows a schematic illustration of an injection system for injecting fuel into the cylinder of an internal combustion engine, according to an example embodiment of the present invention.

FIG. 1 shows an arrangement of an injection system 1 for an internal combustion engine 2 of a motor vehicle, for which a cylinder 3 (of in particular a plurality of cylinders) is shown as an example. The internal combustion engine 2 is preferably configured as a diesel engine with direct injection, but can also be provided as a gasoline engine.

The cylinder 3 comprises an inlet valve 4 and an outlet valve 5 for supplying fresh air and for discharging combustion exhaust gas.

Fuel for operating internal combustion engine 2 is moreover injected into a combustion chamber 7 of cylinder 3 via an injection valve 6. For this purpose, fuel is supplied to the injection valve via a fuel supply line 8, via which fuel is made available under high fuel pressure in a conventional manner (e.g., common rail).

The injection valve 6 comprises an electromagnetically or piezoelectrically controllable actuator unit 61 which is coupled to a valve needle 62. In the closed state of the injection valve 6, the valve needle 62 is seated on a needle seat 63. Activation of the actuator unit 61 moves the valve needle 62 in longitudinal direction and uncovers part of a valve opening in the needle seat 63 in order to inject the pressurized fuel into the combustion chamber 7 of the cylinder 3.

The injection valve 6 further comprises a piezo sensor 65, which is disposed in the injection valve 6. The piezo sensor 65 is deformed by pressure changes in the fuel passing through the injection valve 6 and is generated as a sensor signal by a voltage signal.

The injection is controlled by a control unit 10 which specifies a quantity of fuel to be injected by energizing the actuator unit 61. The sensor signal is temporally sampled in the control unit 10 with the aid of an A/D converter 11, in particular at a sampling rate of 0.5 to 5 MHz.

During operation of the internal combustion engine 2, the sensor signal is used to determine a correct opening and/or closing time of the injection valve 6. For this purpose, the sensor signal is digitized into a sensor signal time series by means of the A/D converter 11 and evaluated by a suitable evaluation model, from which an open duration of the injection valve 6 and correspondingly an injected fuel quantity can be determined as a function of the fuel pressure and other operating variables. To determine the open duration, an opening time and a closing time are in particular needed to determine the open duration as the time difference of these variables.

The determination of an opening time and/or a closing time can be carried out based on the consideration of the sensor signal profile. The opening time and/or the closing time can in particular be determined with the aid of a data-based evaluation model.

The creation of data-based models requires training data sets, wherein the robustness and accuracy of the model is significantly dependent on the quality of the training data.

Figure 2:
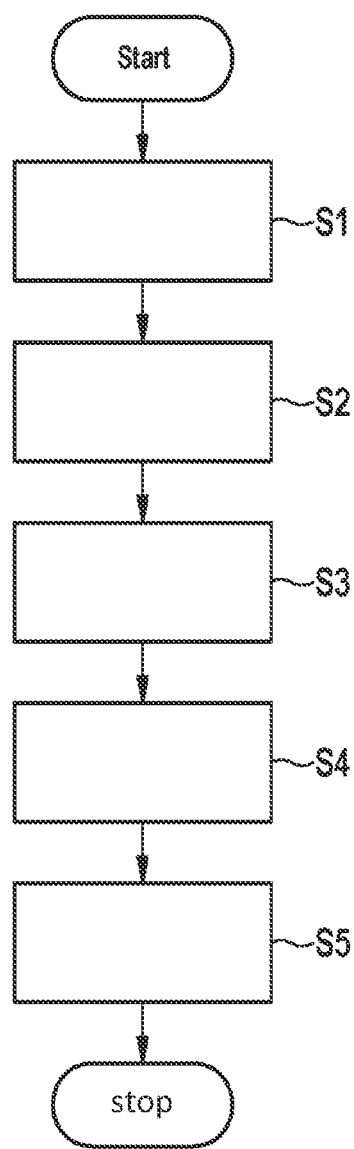
FIG. 2 shows an illustration of a method for determining training data sets for training a data-based evaluation model for determining an injected fuel quantity, according to an example embodiment of the present invention.

The determination of training data sets is carried out on a test stand, on which the operation of the injection valve 6 is measured on an operating internal combustion engine 2. The method for determining training data sets is described in the following with reference to the flow chart of FIG. 2.

In Step S1, in particular operating variables, the temporal progression of the sensor signal of the piezo sensor and the exact opening or closing times are recorded as labels for one or more working cycles. The sensor signal is acquired by sampling, wherein the sampling frequency is between 0.5 and 5 MHz. The sensor signal is preferably sampled in an evaluation period, in which the injection valve 6 opens and closes. The evaluation period can be established with respect to an activation time window of the injection valve, which is defined by the start of the activation of the actuator unit 61 and an established period of time that specifies a maximum period of time in which the activation signal for the actuator unit 61 provides a valve opening. The activation time window thus includes a defined time reference, for which an evaluation point time series is provided that represents the basis for the further determination of an opening or closing time.

To determine training data sets from such a sensor signal time series, it is divided in Step S2 into temporally equally spaced time windows in a processing unit of the test stand. The time windows have a temporal length that is greater than the time steps corresponding to the sampling rate of the sensor signal. The time windows are in particular temporally spaced apart from one another with an evaluation time which corresponds to the temporal resolution of the evaluation points processed as the evaluation point time series in the data-based evaluation model. The evaluation time can be between 5 μs and 20 μs.

The time windows can be directly adjacent to one another or temporally spaced apart from one another. The time windows are selected to be large enough that multiple sampling times of the sensor signal are always included.

Figure 3:
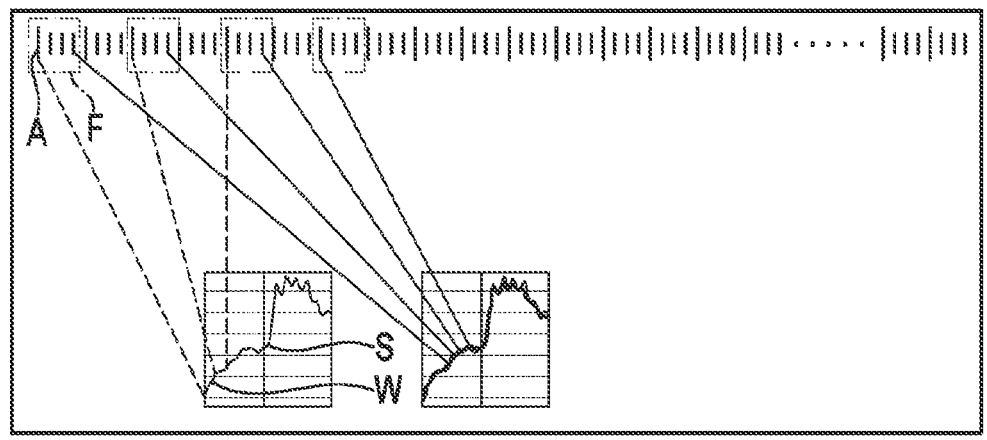
FIG. 3 shows a schematic illustration of sampling times of the sensor signal and the position of time windows with respect to the evaluation times for the evaluation point time series, according to an example embodiment of the present invention.

An example of this is shown in the illustration of FIG. 3. A sequence of sampling values A can be seen, each of which is assigned a sensor signal value W of a sensor signal S. The sampling values A are temporally equally spaced, e.g., at 1 μs, and form a sensor signal time series. Successive time windows F are provided which, in the shown embodiment example, each include four sampling values of the sensor signal S. The time windows F have a corresponding spacing of 8 μs, while the sampling values are acquired at 1 μs intervals.

In Step S3, sampling values A corresponding to sensor signal values W and the evaluation points for the evaluation point time series to be created are randomly selected from the time windows F in order to determine training data sets.

The random selection of the sampling values A within the time windows F can be carried out according to a uniform distribution across the sampling values A contained in the time windows F or according to a Gaussian distribution or another distribution. In other words, the random selection is carried out based on probabilities of a distribution of the sampling values within the time windows, which can correspond to a uniform distribution, a Gaussian distribution or another distribution. In the case of a uniform distribution, this means that each sampling value within the time window is selected with equal probability. In the case of a Gaussian distribution, this means that the sampling values in the middle of the time window are selected with higher probability than the sampling values on the edge of the time window.

Thus time series of evaluation times that differ from one another are obtained.

In Step S4, all of the evaluation point time series created from a sensor signal time series can be assigned to the same label in order to form training data sets. The labels can correspond to fuel injection durations, an opening time and/or a closing time measured on a test stand.

Consequently, in Step S5 the data-based evaluation model is created according to the training data sets and implemented in the control unit 10 of the internal combustion engine 2.

Figure 4:
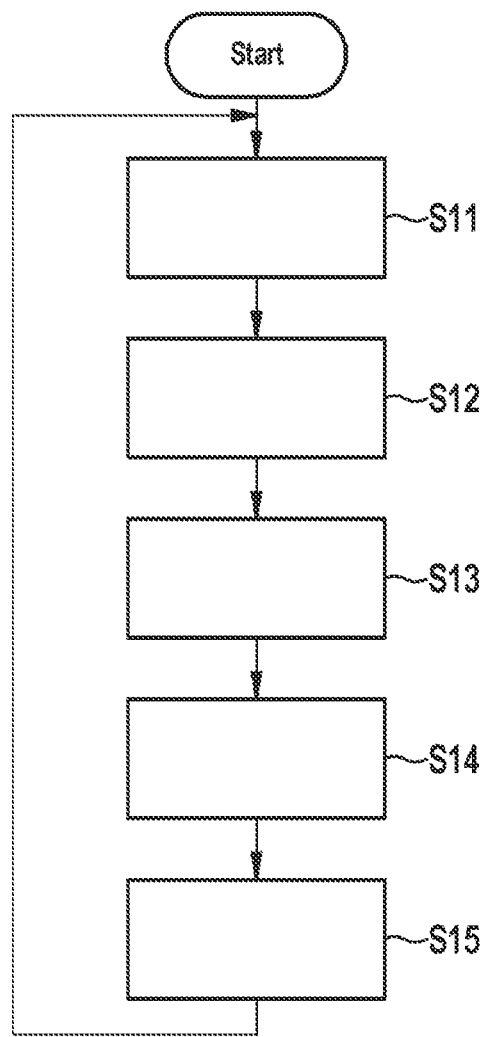
FIG. 4 shows a flow chart to illustrate a method for using a trained data-based evaluation model for determining an injected fuel quantity, according to an example embodiment of the present invention.

FIG. 4 shows a flow chart illustrating a method for operating the injection system 1, in particular in connection with a determination of the injection duration, the opening time and/or the closing time of an injection valve.

In Step S11, a sensor signal of the piezo sensor 65 is sampled at a high sampling rate for this purpose.

In Step S12, the sensor signal is segmented into time windows F which have a respective spacing to one another that corresponds to a predetermined evaluation rate.

In Step S13, the sampling values of the sensor signal (sensor signal time series) within a time window are now averaged or weighted and averaged according to a predetermined distribution to obtain an evaluation point.

In Step S14, the evaluation point is made available to the previously trained data-based evaluation model as an evaluation point time series in order to determine an opening and/or closing time from it.

The opening and/or closing time is now used in Step S15 to determine an open duration of the injection valve and correspondingly an injected fuel quantity.

The determined injection quantity can in particular be used in a conventional manner to regulate an engine torque, improve the smooth running of the internal combustion engine, improve the efficiency thereof and to carry out a method for exhaust aftertreatment.

What is claimed is:

1. A method for training a data-based evaluation model for determining an opening time or a closing time of an injection valve based on a sensor signal, the method comprising the following steps:
    measuring an operation of the injection valve to determine at least one sensor signal and an associated opening or closing time;
    sampling the sensor signal at a sampling rate to obtain a sensor signal time series with sensor signal values;
    determining a plurality of training data sets by assigning a plurality of evaluation point time series generated from the sensor signal time series to the opening or closing time associated with the sensor signal, wherein the evaluation point time series have a lower temporal resolution than the sensor signal time series; and training the data-based evaluation model depending on the determined training data sets.

2. The method according to claim 1, wherein the plurality of evaluation point time series are generated from the sensor signal by defining time windows which are spaced evenly in terms of time in accordance with the temporal resolution of the evaluation point time series and each include a plurality of successive sensor signal values, wherein, for each time window, one of the sensor signal values contained therein is randomly selected as an evaluation point, so that a plurality of different evaluation point time series including the evaluation points of the successive time windows are generated for the sensor signal.

3. The method according to claim 2, wherein the random selection of the sensor signal values is carried out according to a uniform distribution or a Gaussian distribution.

4. The method according to claim 1, wherein the data-based evaluation model corresponds to or comprises a probabilistic regression model or a neural network or a classification model.

5. A method for operating an injection system in connection with determining an opening time or a closing time of an injection valve, the method comprising the following steps:
sampling a sensor signal at a sampling rate in order to obtain a sensor signal time series with sensor signal values;
determining an evaluation point time series from the sensor signal time series by segmenting the sensor signal time series into equally spaced time windows and determining a respective evaluation point of the evaluation point time series based on the sensor signal values within the respective time window;
determining the opening time or the closing time depending on the determined evaluation point time series and a trained data-based evaluation model, wherein the data-based evaluation model is trained to assign an opening time or a closing time to an evaluation point time series; and
operating the injection system using the determined opening time or the closing time;
wherein the data-based evaluation model is trained by:
measuring an operation of the injection valve to determine at least one first sensor signal and an associated opening or closing time;
sampling the first sensor signal at a sampling rate to obtain a first sensor signal time series with first sensor signal values;
determining a plurality of training data sets by assigning a plurality of first evaluation point time series generated from the first sensor signal time series to the opening or closing time associated with the first sensor signal, wherein the first evaluation point time series have a lower temporal resolution than the first sensor signal time series;
training the data-based evaluation model depending on the determined training data sets.

6. The method according to claim 5, wherein the operation of the injection valve is carried out such that an open duration of the injection valve ascertained via the determined opening and/or closing time is set to a predetermined target open duration.

7. A device configured to train a data-based evaluation model for determining an opening time or a closing time of an injection valve based on a sensor signal, the device configured to:
measure an operation of the injection valve to determine at least one sensor signal and an associated opening or closing time;
sample the sensor signal at a sampling rate to obtain a sensor signal time series with sensor signal values;
determine a plurality of training data sets by assigning a plurality of evaluation point time series generated from the sensor signal time series to the opening or closing time associated with the sensor signal, wherein the evaluation point time series have a lower temporal resolution than the sensor signal time series;
train the data-based evaluation model depending on the determined training data sets.

8. A machine-readable storage medium on which is stored a computer program including instructions for training a data-based evaluation model for determining an opening time or a closing time of an injection valve based on a sensor signal, the instructions, when executed by a computer, causing the computer to perform the following steps:
measuring an operation of the injection valve to determine at least one sensor signal and an associated opening or closing time;
sampling the sensor signal at a sampling rate to obtain a sensor signal time series with sensor signal values;
determining a plurality of training data sets by assigning a plurality of evaluation point time series generated from the sensor signal time series to the opening or closing time associated with the sensor signal, wherein the evaluation point time series have a lower temporal resolution than the sensor signal time series;
training the data-based evaluation model depending on the determined training data sets.

* * * * *